United States Patent
Hill

(10) Patent No.: US 7,068,260 B2
(45) Date of Patent: Jun. 27, 2006

(54) HIGH-LEVEL FUNCTION SELECTION FOR MULTI-FUNCTION DEVICE

(75) Inventor: Chris T. Hill, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 09/946,383

(22) Filed: Sep. 4, 2001

(65) Prior Publication Data

US 2003/0043205 A1 Mar. 6, 2003

(51) Int. Cl.
*G09G 5/00* (2006.01)
(52) U.S. Cl. ............ 345/173; 345/156; 358/1.13; 358/1.15; 399/81; 399/82
(58) Field of Classification Search ............ 345/173, 345/156, 700, 716–717; 358/1.15, 1.13; 399/81–82
See application file for complete search history.

(56) References Cited

U.S. PATENT DOCUMENTS

| | | | | |
|---|---|---|---|---|
| 4,332,464 A | * | 6/1982 | Bartulis et al. | 399/14 |
| 5,109,252 A | * | 4/1992 | Schott, Jr. | 399/83 |
| 5,321,802 A | * | 6/1994 | Furuya et al. | 358/403 |
| 6,353,482 B1 | * | 3/2002 | Abe et al. | 358/1.15 |
| 6,434,343 B1 | * | 8/2002 | Kobayashi et al. | 399/8 |
| 6,470,155 B1 | * | 10/2002 | Martin et al. | 399/81 |
| 6,477,341 B1 | * | 11/2002 | Nomura et al. | 399/81 |
| 6,577,907 B1 | * | 6/2003 | Czyszczewski et al. | 700/17 |
| 2001/0017615 A1 | * | 8/2001 | Lin et al. | 345/173 |
| 2001/0022665 A1 | * | 9/2001 | Yajima et al. | 358/1.13 |

* cited by examiner

*Primary Examiner*—Bipin Shalwala
*Assistant Examiner*—Leonid Shapiro

(57) ABSTRACT

A multi-function device configured to perform a plurality of functions related to document production and transmission is provided. The multi-function device includes a display, the display being configured to present an idle screen when none of the plurality of functions is in use. The idle screen includes a plurality of fields, each field representing a function performed by the multi-function device, wherein selection of a particular field by a user causes the display to present a control interface associated with the function represented by the particular field. The multi-function device may include a touch screen input to allow a user to select a field.

12 Claims, 3 Drawing Sheets

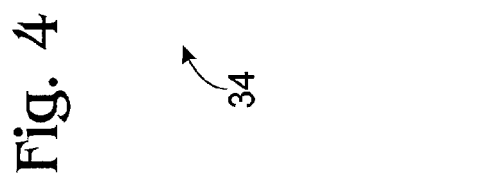
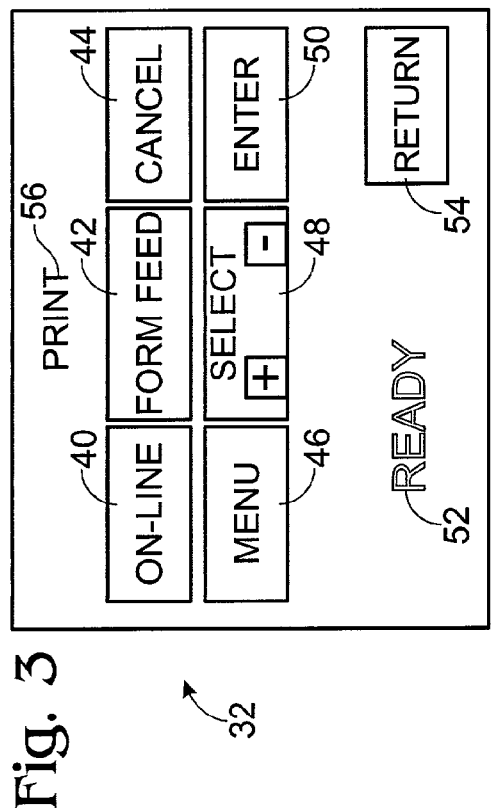
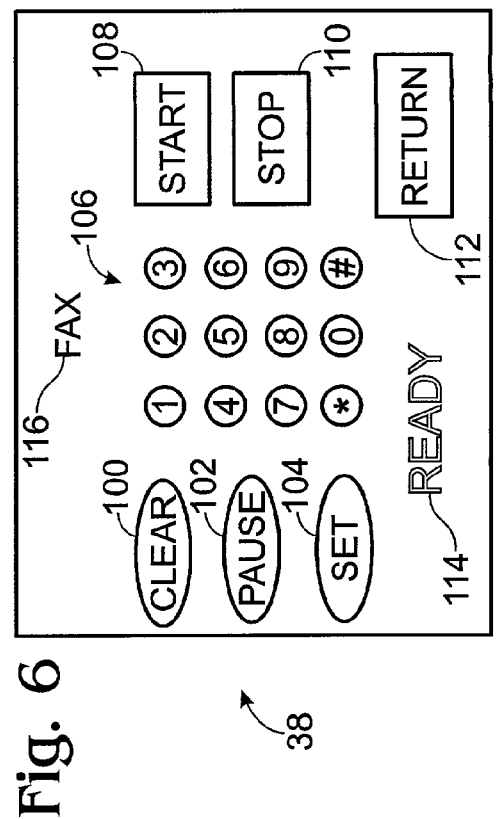
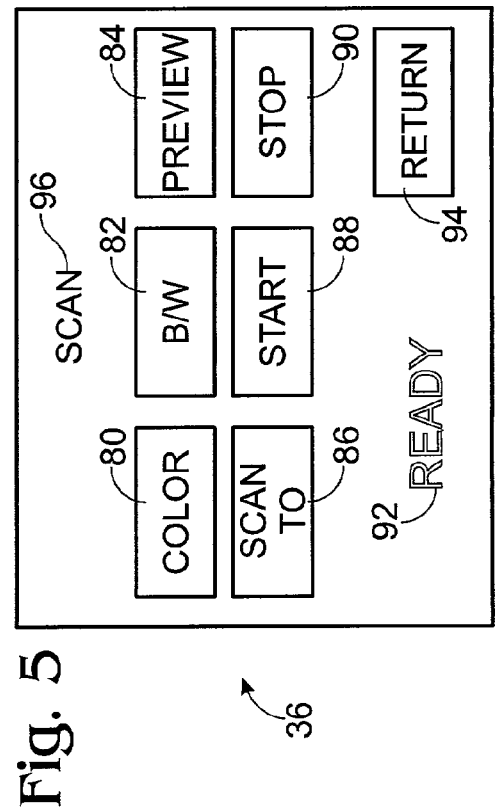

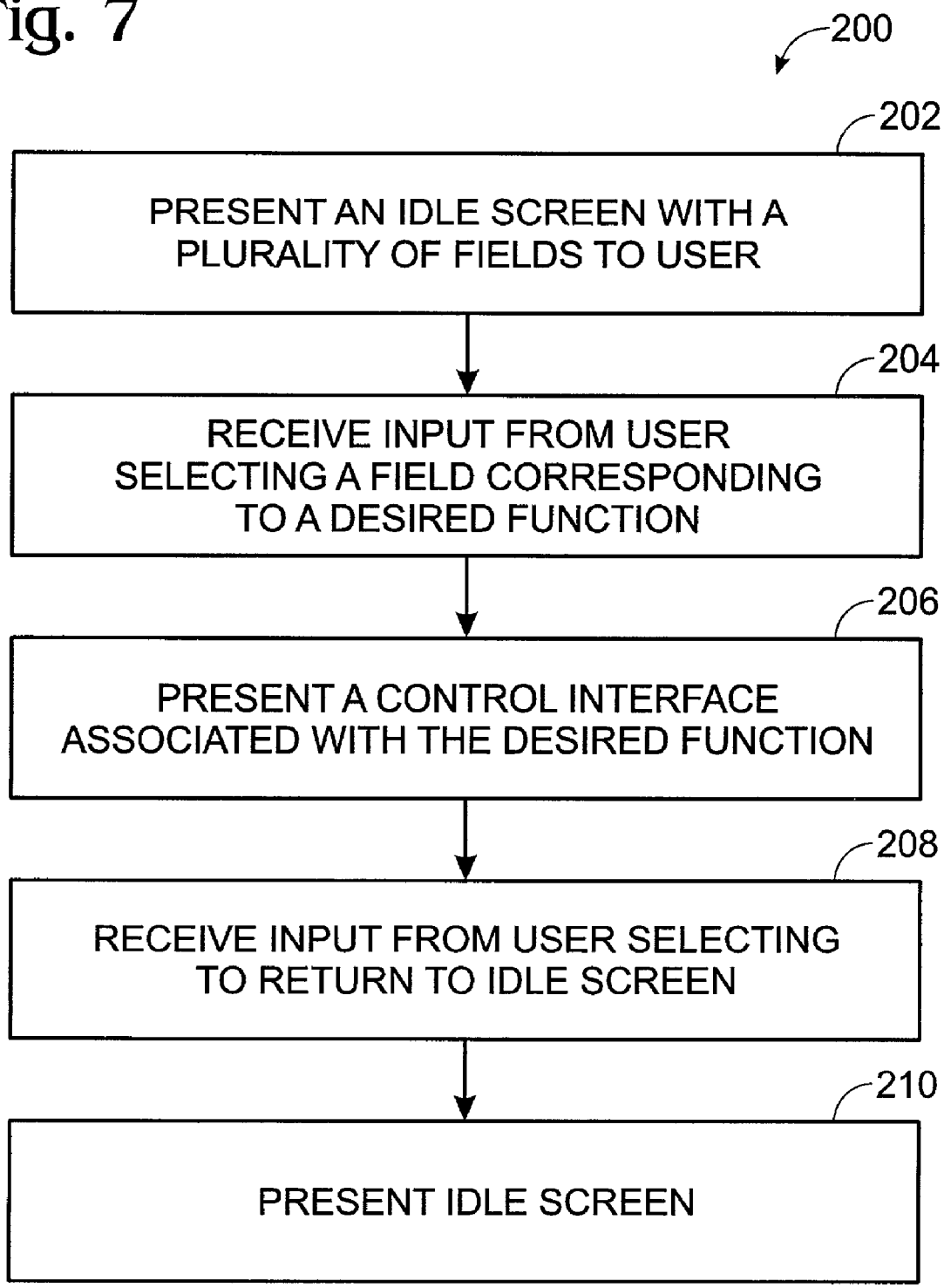

HIGH-LEVEL FUNCTION SELECTION FOR MULTI-FUNCTION DEVICE

TECHNICAL FIELD

The present invention provides an apparatus and method for facilitating selection of an operating mode of a multi-function device.

BACKGROUND OF THE INVENTION

Over the last several years, devices that perform several document-processing functions have been developed. These devices are known generally as multi-function devices. One type of multi-function device, known as a MOPIER® (Multiple Original Printer), is a networked printer that combines the functionalities of a printer and a photocopier, quickly printing multiple copies of documents of a high quality, and at a lower cost, than traditional copiers. Some multi-function devices are capable of performing even more tasks. For example, some have the capability to operate as a copier, printer, scanner and facsimile machine.

Multi-function devices offer several potential advantages over the use of multiple individual devices. For example, a single multi-function device generally uses less space than multiple individual devices. Also, the cost of a single multi-function device may be lower than the cost of multiple individual devices. However, current multi-function devices also suffer from some drawbacks. One possibly significant drawback is the complexity of the operation of the device.

Typical multi-function devices have a control panel with both an array of buttons, and an LCD or other flat panel display. In general, the complexity of the control panel, including the number of buttons on the panel and the number of messages and options shown on the display, increases with the functionality of the device. For a device with fax, print, copy and scan functions, the control panel may be sufficiently complex to intimidate new users, and even to confuse experienced users. For example, a prominent feature on a typical multi-function device is the display. Thus, users may look first to the display for information on the operation of the device. However, the display may not indicate to users how to change between operating modes, or even which operating mode the machine is currently in. While the controls allowing a user to switch operating modes generally are marked, they may not be obvious enough to overcome the initial confusion and intimidation felt by new or inexperienced users when looking at the complex control panel.

Furthermore, because of space and efficiency considerations, there is generally no single control panel for each function. Instead, each individual button on the control panel typically performs a different task in each of the different operating modes. Thus, the difficulty presented by having to learn to operate the control panel in each different operation mode also may intimidate new users. As a result, these new users may choose not to use the multi-function device, and instead opt to use less efficient, but simpler, older devices.

SUMMARY OF THE INVENTION

The present invention provides a multi-function device configured to perform a plurality of functions related to document reproduction and transmission. The multi-function device includes a display which provides a graphical user interface, the display being configured to present an idle screen when none of the plurality of functions is in use. The idle screen includes a plurality of fields, each field representing a function performed by the multi-function device, wherein selection of a particular field by a user causes presentation of a control interface for the function represented by the particular field. The multi-function device may include a touch screen input to allow a user to select a field.

BRIEF DESCRIPTION OF THE DRAWINGS

FIG. 3 is a schematic diagram of the display of FIG. 1, the display showing an exemplary print interface.

FIG. 4 is a schematic diagram of the display of FIG. 1, the display showing an exemplary copy interface.

FIG. 5 is a schematic diagram of the display of FIG. 1, the display showing an exemplary scan interface.

FIG. 6 is a schematic diagram of the display of FIG. 1, the display showing an exemplary facsimile interface.

FIG. 7 is a flowchart showing a first embodiment of a method of selecting an operating mode of a multi-function device according to the present invention.

DETAILED DESCRIPTION OF THE DEPICTED EMBODIMENTS

Figure 1:
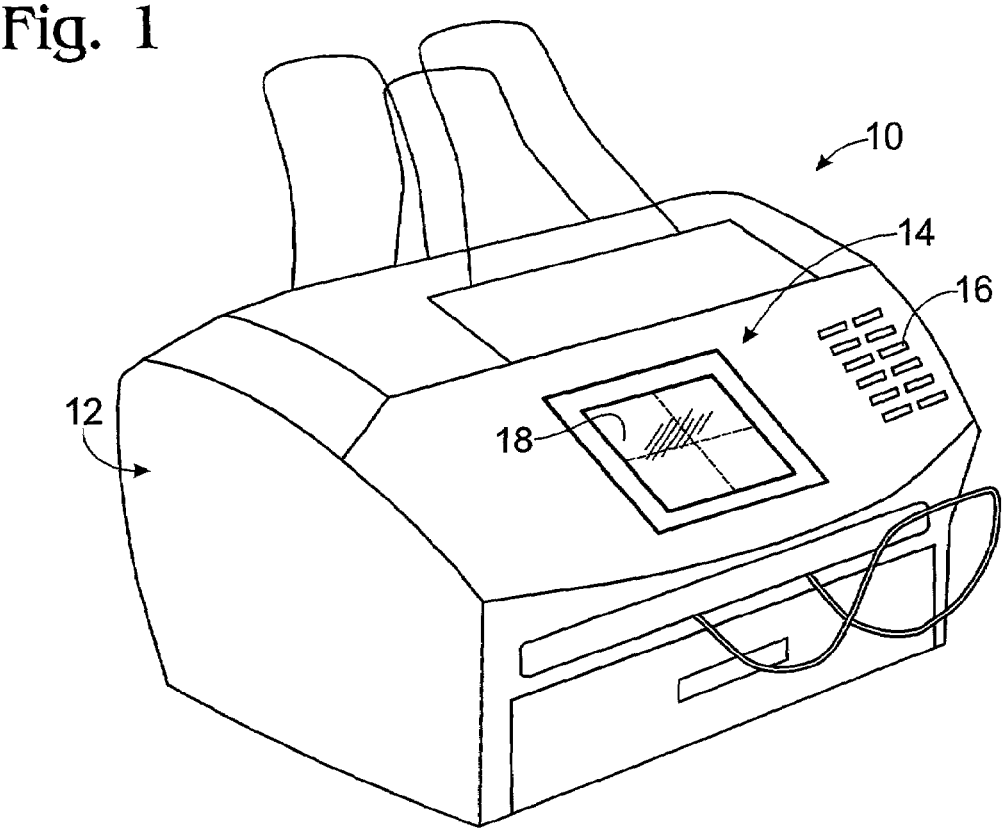
FIG. 1 shows a multi-function device according to the present invention having a control panel with a display.

One embodiment of a multi-function device according to the present invention is shown generally at 10 in FIG. 1. Multi-function device 10 includes a body 12 enclosing various document processing systems, and a control panel 14 that provides for user control of multi-function device 10.

Control panel 14 is positioned on an upper portion of multi-function device 10, at a location where it is easily viewable and accessible by a user. Control panel 14 includes one or more control buttons 16, (e.g. a power control button) and includes a display 18 which provides a graphical user interface. Display 18 is sized and positioned on control panel 14 in such a manner as to draw a user's eye when the user looks at the control panel.

When multi-function device 10 is not in use (i.e. is idle), an idle screen is presented on display 18. The idle screen, described in more detail below, is divided into a plurality of fields representing the individual functions performed by the multi-function device. Using the graphical user interface, the user can select a particular field corresponding to a desired function. This opens a control interface screen for the desired function on display 18, typically to the exclusion of the idle screen or other control interface screens.

Displaying all of the individual functions of the multi-function device on the idle screen offers a new user a very simple-to-understand interface for selecting a device operating mode. Thus, the use of such an idle screen may make multi-function device 10 seem less intimidating to many users, who may therefore be less hesitant to use it. While multi-functional device 10 is shown as a desktop-sized item in FIG. 1, it will be appreciated that a multi-functional device according to the present invention may take the form of any desired document production/transmission device, large or small.

Figure 2:
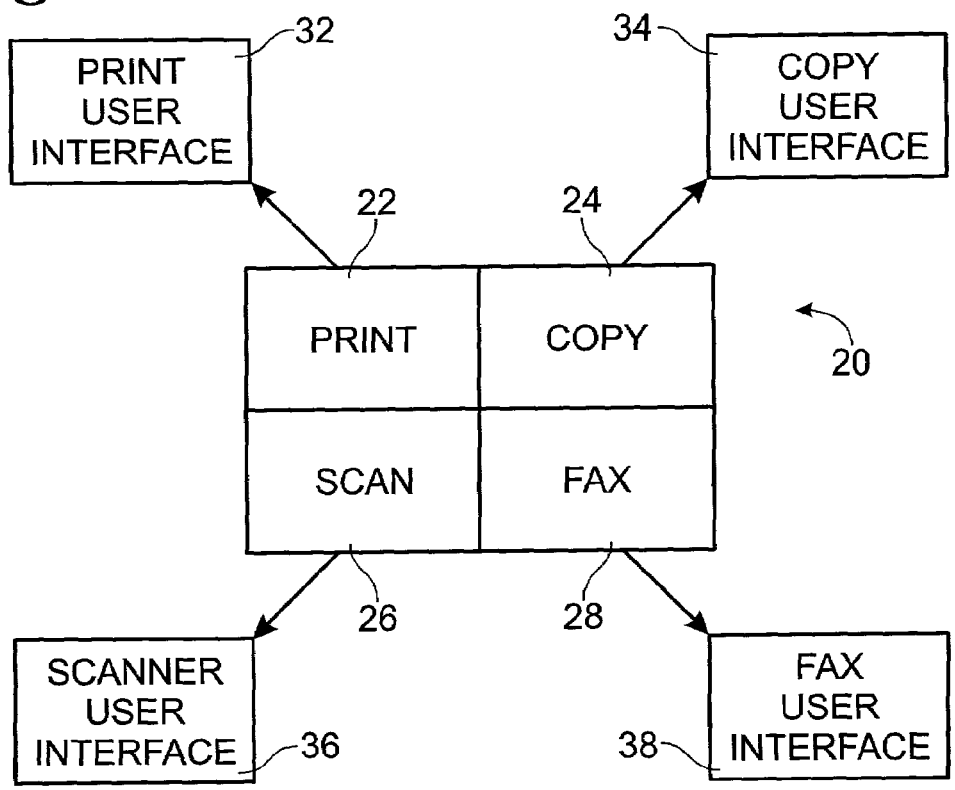
FIG. 2 is a schematic diagram of the display of FIG. 1, the display showing an idle screen with user-selectable fields and interfaces associated with each field.

FIG. 2 shows generally at 20 one example of a suitable idle screen. Idle screen 20 includes four fields, corresponding to four exemplary operating modes of multi-function device 10: a print field 22, a copy field 24, a scan field 26 and a facsimile field 28. Each of fields 22, 24, 26 and 28 has text indicating the function represented by the field. In the depicted embodiment, the function represented by each field 22, 24, 26 and 28 is indicated simply with a word identifying the function. However, any desired text, icon, object or other designator may also be used to indicate the functions represented by the fields.

Similarly, the fields may be arranged on display 18 in any desired arrangement. In the depicted embodiment, the four fields are arranged as quadrants on display 18, fully occupying the entire display, and the text indicating the function represented by each field is positioned prominently in the center of the field. Arranging the four fields as quadrants is advantageous, as it gives each field the largest possible surface area, facilitating the selection of a desired field. However, the fields may also be arranged in any other desired manner without departing from the scope of the present invention. For example, the fields may be arranged in a vertical fashion down a single column, or may be arranged horizontally across display 18.

The choice of a suitable arrangement of fields on idle screen 20 may depend in large part upon the number of fields displayed on the idle screen. While idle screen 20 typically has only as many fields as there are functions of multi-function device 10, it will be appreciated that idle screen 20 may also have either more or fewer fields. For example, idle screen 20 may have additional fields for such device-wide functions as putting multi-function device 10 in a sleep mode or power-down mode. Likewise, idle screen 20 may display a lesser number of fields in the form of broad, higher-level categories under which the individual functions are grouped.

Turning now to the graphical user interface, any suitable selecting device may be used to allow the selection of a desired field. Examples of suitable selecting devices include a mouse or trackball. Preferably, however, the graphical user interface utilizes a touch screen input as a selection device. A touch screen input is a type of display screen that has a touch-sensitive transparent panel covering the screen. Instead of using a mouse or trackball, a user can select a desired field by touching the screen with a finger. The use of a touch screen input is advantageous because it is simpler and quicker to use in the context of a display screen on a machine than other selection devices. Additionally, the large size of fields 22, 24, 26 and 28 on display 18 allows a desired field to be easily selected without a significant risk of error.

As mentioned above, and as shown in FIG. 2, the selection of a field on idle screen 20 causes an interface associated with that field to open on display 18. For example, the selection of print field 22 opens a printer interface 32. Similarly, selection of copy field 24 opens a copier interface 34, selection of scan field 26 opens a scanner interface 36, and selection of fax field 28 opens a facsimile interface 38. In the depicted embodiment, selection of a desired field opens the desired interface to the exclusion of any other interfaces. However, it will be appreciated that the desired interface may also open across only part of display 18, leaving room for other information, such as a reduced-size idle screen.

FIGS. 3–6 show printer interface 32, copier interface 34, scanner interface 36 and facsimile interface 38 in more detail. Each of the interfaces includes a plurality of controls operable by the touch screen input (or other input device). It will be appreciated that the controls shown in the depicted interfaces are merely exemplary, and that actual interfaces may have any other desired controls or layout.

Referring first to FIG. 3, printer interface 32 includes ordinary printer controls, such as an on-line control 40 (for opening or closing the connection between the printer and an attached document transmission device), form feed control 42 (for feeding a sheet of paper through the printer), print cancel control 44 (for canceling a print job), and controls for accessing more complex printer functions, such as a menu control 46 (for opening a menu screen), select control 48 (for selecting a menu choice), and enter control 50 (for executing the selected choice). In the depicted embodiment, each of these controls is depicted on display 18, but some of these controls may be positioned on other parts of the control panel if desired.

Printer interface 32 also has a dialog box 52 for reporting printer status, errors, etc., and a return control to return to idle screen 20. Finally, printer interface may include a title 56, which identifies the interface as the printer interface so a user approaching the machine can quickly tell which mode of operation multi-function device 10 is in.

Next, referring to FIG. 4, copier interface 34 may include any desired controls for the operation of the copier function of multi-function device 10. Several exemplary controls are shown in FIG. 4, including a start control 60 (for starting a copy process), a stop/clear control 62 (for stopping/resetting a copy process), and a number pad 64 (for selecting the number of copies to be made, etc.). Also, copier interface 34 may include a return control 68 (to return to idle screen 20), a dialog box 66 (for communicating machine status information to a user), and a title 70 identifying the interface as the copier interface.

Referring next to FIG. 5, scanner interface 36 may also include any desired controls for the operation of the scanner function, such as color and black/white selection controls 80 and 82, respectively, a preview control 84 (allowing a user to first preview a scanned document before saving it to a file), and a "scan to" control 86 (allowing a user to select a file format for the scanned image). Scanner interface 36 may also include controls such as a start control 88, a stop control 90, and a return control 94 for returning to idle screen 20. Finally, scanner interface 36 also may include a dialog box (for indicating scanner status information to a user), and a title 96 for identifying the scanner function as the current mode of operation.

Finally, referring to FIG. 6, facsimile interface 38 may include any desired controls for the operation of the facsimile function of multi-function device 10. Exemplary controls shown in FIG. 6 include a clear control 100 (for resetting the facsimile function), a pause control 102 (for pausing transmission), a set control 104 (for setting machine modes, entering speed dial numbers, etc.), a numeric keypad 106 (for dialing the receiving machine's number), a start control 108 (for starting transmission), a stop control 110 (for stopping transmission) and a return control 112 (for returning to menu screen 20). Finally, facsimile interface 38 may include a dialog box 114 and a title 116 identifying the facsimile function as the current mode of operation.

The present invention also provides a method of facilitating the selection of an operating mode of a multifunction device. A first embodiment of a method according to the present invention is shown generally in FIG. 7 at 200. Method 200 first includes presenting an idle screen with a plurality of user selectable fields to a user at 202. As described above, the idle screen may have any desired appearance, and may allow the selection of any functions performed by the multi-function device. Next, at 204, an input is received from the user selecting a field corresponding to a desired multi-function device function. Upon receipt of the user input at 204, a control interface associated with the desired function is presented on the display at 206. The control interface (or sub-screens of the control interface)

remains displayed until an input is received at 208 from the user selecting to return to the idle screen. Upon receipt of this user input, the idle screen is again presented on the display at 210.

While the present invention has been particularly shown and described with reference to the foregoing depicted embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. A multi-functional device configured to perform a plurality of functions related to document processing, the multi-functional device comprising:
   a display configured to provide a graphical user interface, the display being configured to present an idle screen when none of the plurality of functions are in use, wherein the idle screen is divided into a plurality of fields, each field representing an operating mode performed by the multi-functional device;
   wherein selection of a field by a user causes the display to display a control screen associated with the operating mode represented by the selected field; and
   wherein the control screen for the operating mode re resented by the selected field includes a return control selectable by the user to cause the display to present the idle screen.

2. The multi-functional device of claim 1, wherein the display includes a touch panel input to accommodate user selection of a field.

3. The multi-functional device of claim 1, wherein selection of a field by the user causes the display to replace the idle screen with a control screen associated with the operating mode represented by the selected field, to the exclusion of the idle screen.

4. The multi-functional device of claim 1, wherein the plurality of operating modes includes copy, facsimile, print, and scan operating modes.

5. A multi-functional device configured to perform a plurality of functions related to document processing, the multi-functional device comprising:
   a display configured to provide a graphical user interface, the display being configured to present an idle screen when none of the plurality of functions are in use, wherein the idle screen is divided into a plurality of fields, each field representing an operating mode performed by the multi-functional device;
   wherein selection of a field by a user causes the display to display a control screen associated with the operating mode represented by the selected field;
   wherein the plurality of operating modes includes copy, facsimile, print, and scan operating modes; and
   wherein the plurality of fields includes fields representing the copy, facsimile, print, and scan operating modes displayed as quadrants on the display.

6. A multi-functional device configured to perform a plurality of functions related to document production and transmission, the multi-functional device comprising: a display with a touch panel input, the display being configured to present an idle screen when the multi-functional device is idle, the idle screen including a plurality of fields displayed as quadrants on the display, the fields representing copy, facsimile, print and scan operating modes of the multi-functional device, wherein touching a particular field effects selection of a particular operating mode, causing the display to present a control interface associated with the selected particular operating mode.

7. The multi-functional device of claim 6, wherein selection of a particular operating mode causes the display to replace the idle screen with the control screen associated with the selected particular operating mode.

8. The multi-functional device of claim 6, wherein the control screen for the selected particular operating mode includes a return control touch-selectable to cause the display to present the idle screen.

9. A method of providing for high-level control of a multi-functional device by a user, the multi-functional device being configured to operate in any of a plurality of operating modes related to document production and transmission and having a display, the method comprising:
   displaying an idle screen on the display to the user when the multifunctional device is idle, the idle screen having a plurality of fields, the plurality of fields including fields displayed as quadrants on the display, the fields representing copy, facsimile, print and scan operating modes of the multi-functional device;
   receiving an input from the user selecting a field corresponding to a desired operating mode; and
   replacing the idle screen with a control screen associated with the desired operating mode.

10. A method of providing for high-level control of a multi-functional device by a user, the multi-functional device being configured to operate in any of a plurality of operating modes related to document production and transmission and having a display, the method comprising:
   displaying an idle screen on the display to the user when the multifunctional device is idle, the idle screen having a plurality of fields, the plurality of fields including fields representing the plurality of operating modes of the multi-functional device;
   receiving an input from the user selecting a field corresponding to a desired operating mode; and
   replacing the idle screen with a control screen associated with the desired operating mode;
   wherein the plurality of operating modes includes copy, facsimile, print, and scan operating modes; and
   wherein displaying the idle screen having fields that represent copy, facsimile, print, and scan operating modes includes displaying the fields that represent copy, facsimile, print, and scan operating modes as quadrants on the display.

11. The method of claim 9, wherein selecting a field corresponding to a desired operating modes includes touching a touch panel.

12. The method of claim 9, further comprising returning to the idle screen upon selection of a return control on the control screen.

* * * * *

UNITED STATES PATENT AND TRADEMARK OFFICE
CERTIFICATE OF CORRECTION

| | | |
|---|---|---|
| PATENT NO. | : 7,068,260 B2 | Page 1 of 1 |
| APPLICATION NO. | : 09/946383 | |
| DATED | : June 27, 2006 | |
| INVENTOR(S) | : Chris T. Hill | |

It is certified that error appears in the above-identified patent and that said Letters Patent is hereby corrected as shown below:

In column 5, lines 35-36, in Claim 1, delete "re resented" and insert -- represented --, therefor.

Signed and Sealed this

Third Day of March, 2009

JOHN DOLL
*Acting Director of the United States Patent and Trademark Office*